(12) United States Patent
Giesa et al.

(10) Patent No.: US 12,465,534 B2
(45) Date of Patent: Nov. 11, 2025

(54) HOLDING SYSTEM FOR A WHEELCHAIR IN AN AIRCRAFT

(71) Applicant: Airbus Operations GmbH, Hamburg (DE)

(72) Inventors: Hans-Gerhard Giesa, Hamburg (DE); Matthias Breuer, Hamburg (DE); Mark Herzog, Hamburg (DE); Leonie Kamens, Hamburg (DE); Dürüye Dogan Sari, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 468 days.

(21) Appl. No.: 17/921,385

(22) PCT Filed: Apr. 28, 2021

(86) PCT No.: PCT/EP2021/061076
§ 371 (c)(1),
(2) Date: Oct. 26, 2022

(87) PCT Pub. No.: WO2021/219693
PCT Pub. Date: Nov. 4, 2021

(65) Prior Publication Data
US 2023/0240918 A1    Aug. 3, 2023

(30) Foreign Application Priority Data

Apr. 30, 2020    (DE) .......................... 102020111829.5

(51) Int. Cl.
*A61G 3/00*    (2006.01)
*A61G 3/08*    (2006.01)
*B64D 11/00*   (2006.01)

(52) U.S. Cl.
CPC ............ *A61G 3/0808* (2013.01); *B64D 11/00* (2013.01)

(58) Field of Classification Search
CPC ......... B64D 11/00; A61G 3/0808; A61G 3/08
See application file for complete search history.

(56) References Cited

U.S. PATENT DOCUMENTS

| 5,026,225 A | 6/1991 | Mcintyre |
| 5,388,937 A | 2/1995 | Farsai |

(Continued)

FOREIGN PATENT DOCUMENTS

| DE | 3532219 A1 | 3/1987 |
| DE | 202015105429 U1 | 1/2017 |

(Continued)

OTHER PUBLICATIONS

International Search Report dated Jul. 13, 2022; priority document.
German Search Report dated Mar. 1, 2021; priority document.

*Primary Examiner* — Steven O Douglas
(74) *Attorney, Agent, or Firm* — Greer, Burns & Crain, Ltd.

(57) ABSTRACT

A holding system for a wheelchair in an aircraft is proposed, including a plate-shaped base unit having first fastening elements at an underside configured to be connected to complementarily shaped second fastening elements in the form of seat rails on a floor or surrounding structure in the aircraft for fastening the base unit, a front holding unit and a rear holding unit arranged on an upper side of the base unit at a distance from each other and defining therebetween a placement area for a wheelchair. The front holding unit and the rear holding unit are configured to form a releasable form-fit connection with the wheelchair disposed on the placement area so that the wheelchair is braced between the front holding unit and the rear holding unit. The holding system is configured to fix the wheelchair stationarily to the floor during operation of the aircraft.

20 Claims, 8 Drawing Sheets

(56) References Cited

U.S. PATENT DOCUMENTS

| | | | | |
|---|---|---|---|---|
| 5,391,030 | A * | 2/1995 | Lee | A61G 3/0808 |
| | | | | 410/23 |
| 7,455,490 | B1 * | 11/2008 | Goosen | A61G 3/0808 |
| | | | | 410/7 |
| 10,953,987 | B2 * | 3/2021 | Johnson | B64D 11/0691 |
| 2017/0231844 | A1 * | 8/2017 | Gale | A61G 3/0808 |
| | | | | 410/7 |
| 2020/0039626 | A1 | 2/2020 | Johnson et al. | |
| 2020/0113754 | A1 * | 4/2020 | Girardin | B60N 2/245 |

FOREIGN PATENT DOCUMENTS

| | | | |
|---|---|---|---|
| EP | 3608227 | A1 | 2/2020 |
| JP | 2007276846 | A | 10/2007 |
| WO | 2016157081 | A1 | 10/2016 |

* cited by examiner

HOLDING SYSTEM FOR A WHEELCHAIR IN AN AIRCRAFT

CROSS-REFERENCES TO RELATED APPLICATIONS

This application claims the benefit of the International Application No. PCT/EP2021/061076, filed on Apr. 28, 2021, and of the German patent application No. 102020111829.5 filed on Apr. 30, 2020, the entire disclosures of which are incorporated herein by way of reference.

FIELD OF THE INVENTION

The invention relates to a holding system for a wheelchair in an aircraft and to an aircraft having a cabin and a holding system arranged therein.

BACKGROUND OF THE INVENTION

People with limited mobility who are dependent on a wheelchair are often taken into an aircraft cabin on special wheelchairs when traveling by air. These are particularly compact in design and are usually only used for transport into the cabin. Subsequently, the individuals occupy a conventional seat. The personal wheelchair is usually stowed in the cargo compartment of the aircraft or, depending on its size, is sometimes placed in the cabin. On board the aircraft, a special wheelchair is kept ready in a designated storage compartment. It can be retrieved from the storage compartment and used temporarily during the flight to go to an on-board toilet. Switching between different wheelchairs and the seat is inconvenient and time-consuming. In addition, stowing the personal wheelchair requires storage space within the cabin or cargo compartment, which is then no longer available for other purposes. Furthermore, the provision of storage space for carrying a personal wheelchair in the cabin is sometimes mandatory and the carrying is often desired by the user to prevent possible damage or loss of the wheelchair when stored in a cargo compartment. A storage cabinet may be provided for this purpose, or the personal wheelchair may be secured on a row of seats by tension straps. Although a personal wheelchair cannot be used in the cabin in most cases due to its size, it would still reduce the stowage capacity.

U.S. Pat. No. 9,180,969 B2 discloses an aircraft seat assembly for aircraft passengers with limited mobility. The arrangement includes a seat base assembly mountable in an aircraft cabin, the seat base assembly including a first support means and a first attachment means for releasably attaching a seat to the first support means. To enable mounting of the seat base assembly in an aircraft cabin, the seat base assembly may include a base adapted to interact with a mounting rail provided in a floor of the aircraft cabin to secure the base and thus the seat base assembly to the floor of the aircraft cabin.

SUMMARY OF THE INVENTION

An object of the invention is to provide a particularly simple device that can reduce the space required for accommodating, in particular, personal wheelchairs within a cabin of a vehicle and increase comfort for persons who are dependent on a wheelchair.

A holding system for a wheelchair in an aircraft is proposed, comprising a plate-shaped base unit having first fastening elements at an underside adapted to be connected to complementarily shaped second fastening elements in the form of seat rails or hard points on a floor or surrounding structure in the aircraft for fastening the base unit, a front holding unit and a rear holding unit arranged on an upper side of the base unit at a distance from each other and defining therebetween a placement area for a wheelchair, wherein the front holding unit and the rear holding unit are adapted to form a releasable form-fit connection with the wheelchair arranged on the placement area so that the wheelchair is braced between the front holding unit and the rear holding unit, and wherein the holding system is adapted to fix the wheelchair stationarily on the floor during operation of the aircraft.

The particular advantage of the invention is that it enables a person to carry his or her own wheelchair in a cabin of the aircraft in question, with the wheelchair being securely fastened in the cabin. The basic design of the wheelchair is irrelevant, and the retaining system according to the invention serves as a kind of adapter for inserting a wheelchair of any shape on standardized fastening elements in an aircraft cabin. The essential features required for this are explained below.

The base unit may be a kind of support, base, pedestal plate or the like, which forms a base for the arrangement of the wheelchair in the cabin. It is provided with first fastening elements, which are intended to be connected to the second fastening elements. Preferably, the first fastening elements are adapted to standards in a cabin that are commonly found in an aircraft in question. Here, the second fastening elements are floor or seat rails having an opening grid into which correspondingly shaped first fastening elements are insertable. In an aircraft, for example, rails are common which have a cavity comprising a slot interspersed with openings on an upper side, the openings being provided in a certain spacing grid. Mushroom-like locking elements can pass through the openings into the hollow space of the rail and there be clamped to the rail in projecting areas between the openings. The first fastening elements may, for example, have such locking bodies. The number of first fastening elements is not limited. However, it is advantageous if the number is at least three.

However, the invention is not limited to such first locking elements and other embodiments may be considered, depending on the standard found. One objective of the first fastening elements is to lock the base unit to the floor in such a manner that all loads on the base unit during operation of the aircraft can be safely transferred to the second fastening elements and thus to an aircraft structure.

The base unit does not necessarily need to be designed as a single component. Plate-shaped components that have a substantially flat underside and provide a closed upper side to accommodate the wheelchair are suitable. However, it is also conceivable to divide the base unit into two or more separate components, each of which is connected separately to the second fastening elements. This could, for example, define a variable contact surface for the wheelchair or provide a more flexible adaptation to the second fastening elements.

The base unit may be designed similar to false floor panels, a plinth, a pallet, an adapter plate, or other like elements. It is to be understood that the base unit provides a horizontal surface above the primary floor of the aircraft for receiving a wheelchair. The base unit may comprise a composite sandwich design having a core component enclosed by skin elements. To further increase the rigidity of the base unit it may comprise an integral aluminum beam assembly. With an increased rigidity the likelihood of a floor contact induced by a load on the placement area can be reduced.

In addition to the first fastening elements, discrete, a plurality of elastically deformable pads may be provided. These are intended to increase a contact surface in situations, where the aircraft structure is twisted or torsion-bent to such an extent, that outer edges of the base unit are likely to contact the upper floor surface in the aircraft cabin. Instead of the edges or corners of the base unit, the deformable pads contact the upper floor surface to protect floor panels from being damaged.

As an alternative thereto, the outer edges may be chamfered in two directions, such that the base unit tapers in its width and length from a certain height in an upwards and a downwards direction.

Providing the base unit as a plate-shaped component is particularly simple. The base unit may thus be designed to cover a surface section of the floor on which one or more passenger seats are usually arranged. The plate-shaped component may also be easily adapted to particular installation situations where the available surface section is not merely rectangular. For example, the base unit may be intended for placement in a door region or in a conical region of an aircraft cabin in which a surface section allows the placement of a passenger seat or two passenger seats and additionally has further space in which, however, no further, entire passenger seat would be placeable. However, the base unit may also be placed there by means of an adapted design in order to accommodate further elements in addition to the placement area in order to make optimum use of the available installation space. In addition to storage compartments, foldable tables, storage surfaces or other items could also be accommodated. In various embodiments, for example, one placement area and one attendant seat could be arranged in addition to two placement areas for two wheelchairs.

The front holding unit is arranged in the region of a front side of the base unit. It may be provided on an upper side of the base unit, as well as on an end face formed on the base unit to then protrude towards the upper side. The front retaining unit is provided to retain the wheelchair in a form-fit manner and, in particular, to apply a tensile force thereto. The rear holding unit is designed in the same way, and may also be releasably connected to the wheelchair, in particular in order to be able to apply a tensile force. By connecting the front holding unit to the wheelchair and the rear holding unit to the wheelchair, the latter can be braced on the base unit. It is conceivable that instead of tensile forces, compressive forces may also be used to achieve bracing or locking. The holding units would then have to be connected with corresponding, rigid compression rods or the like. Even if the aircraft moves, resulting in a high load factor, the resulting loads can be safely transferred to the base unit. This can then transfer the loads to the structure of the aircraft via the second fastening elements.

The formation of a placement area between the front and rear holding units allows a wheelchair of virtually any shape to be placed in the cabin, and the attachment of the base unit itself can be adapted to a standard in the cabin. The base unit thus provides a flexible interface between the wheelchair and the cabin for the introduction of mechanical loads of a wheelchair. People who are used to their wheelchair thus experience a high degree of individual comfort. No additional space is required to accommodate a personal wheelchair in a storage compartment. Despite major differences in the design and construction of wheelchairs due to their manufacturers, it is still possible to accommodate any number of wheelchairs in the cabin.

The base unit may be beveled on at least one outer edge. At least one outer edge, preferably a plurality of outer edges and possibly all outer edges of the base unit may be beveled. Thus, the respective outer edge comprises a ramp shape that allows a wheelchair to enter the base unit and the placement area more easily, respectively. The bevel angle may be dimensioned to ergonomic principles. Exemplarily, the respective beveled edge may enclose an angle of 20° to 60° and preferably of 30° to 45° to the floor.

The holding system may further comprise a plurality of bearing elements on an underside of the base unit for maintaining a distance of the underside of the base unit and the floor. The bearing elements provide the ability to maintain a distance of the underside of the base unit and the floor. The bearing elements thus act as mechanical interfaces between the base unit and the structure to which it is attached. It prevents the underside of the base unit from flushly resting on the respective structure. The base unit thus does not interfere with an elastic deformation of the structure, floor panels or any other installation outside the second fastening element. The bearing elements limit the mechanical interaction between the base unit and the structure to only the installation positions of the bearing elements. There is no contact between any other part of the base unit and the floor outside the bearing elements. To prevent damaging floor panels, additional elastically deformable pads may be provided (see above).

The first fastening elements may be attached to and/or integrated into and/or coupled with the bearing elements. Depending on the design of the bearing elements they may include or hold the first fastening means. However, they may simply comprise a through-hole, through which the first fastening elements or a part thereof may extend. It is clear that the positions of the bearing elements define the positions of the first fastening elements.

The base unit may comprise a pattern created by a plurality of attachment points, wherein the pattern is configured for receiving a set of first fastening elements in different position constellations to adapt to different sets of second fastening elements in the respective aircraft. Thus, the base unit comprises an arrangement of attachment points, which clearly outnumber the number of first fastening elements of a respective set of the first fastening elements. This arrangement thus allows to install the base unit in different aircraft types, cabin configurations and installation positions inside the respective cabin. The attachment points may simply be realized by through holes, which allow to place the first fastening elements and/or the bearing elements to desired positions on the underside of the base unit. It is conceivable, that the attachment points are marked with different colors or labels to indicate suitable sets of attachment points for respective types of aircraft cabins and installation positions.

The set of first fastening elements may comprise four first fastening elements. It is particularly advantageous if exactly four first fastening elements are used to place the base unit in the respective cabin, as this allows to provide a sufficiently rigid installation of the base unit in the aircraft cabin. For example, two pairs of first fastening elements are coupled with two parallel seat rails in the respective aircraft.

Preferably, the holding units comprise fixing elements, each of which has a connecting element at a free end for form-fit connection to the wheelchair. A fixing element could be in the form of a lashing strap, other traction means, a strut or the like. In a simple case, the connecting element is a hook that can be hooked into a shape feature of the wheelchair. The shape feature may be a portion of a frame structure of the wheelchair. It is conceivable that suitable lashing points are or will also be provided on a manufacturer-specific basis, into which such a connecting element is insertable. Lashing straps may have a variable length by which lashing is achieved. The variable length may be realized by a winding mechanism arranged in the base unit or a winding mechanism provided on the lashing strap. The use of lashing straps is particularly advantageous because they are completely flexible for use with different designs of wheelchairs. Struts or other fixing elements acting on compression may likewise be adjustable in length. Locking devices or holding elements may also be provided as fixing elements, arranged on a wall adjacent to, behind or underneath the wheelchair and designed, for example, to engage in a complementarily shaped receptacle of the wheelchair. Fixation or stabilization in a longitudinal direction of the wheelchair and/or in a lateral direction and/or in a vertical direction are basically conceivable by means of the fixing elements.

In an advantageous embodiment, the restraint system further comprises a safety belt for a user of the wheelchair that is couplable to the base unit. The additional seat belt results in improved safety for a person using the wheelchair, as a seat belt typically provided on a wheelchair is not designed to withstand the loads encountered during operation of the aircraft. The seat belt may be a two-point, three-point, or four-point seat belt and may be directly connected to the base unit or indirectly connected thereto via an intervening member.

In a further advantageous embodiment, the holding system further comprises a support arranged on the base unit, which support comprises at least one support element for a user of the wheelchair. The support is preferably fixedly connected to the base unit. The at least one support element may, for example, comprise a headrest. It is further conceivable to additionally or alternatively provide a back support. Since a wheelchair is usually not designed for the loads that are to be expected in an aircraft during operation, the at least one support element is advantageous for ensuring sufficient support of the user.

It is further advantageous if the safety belt is arranged on the support or a support element arranged thereon.

Furthermore, the at least one support element may be adjustably arranged on the support. The at least one support element may be, for example, pivotable, foldable, displaceable in one, two or three directions, or movable in other ways. This may, for example, allow a path to be cleared, as needed, for placing the wheelchair on the placement area or for leaving the placement area. Meanwhile, vertical and/or horizontal adjustability can be used to adapt to the user's body size.

The support may preferably be positioned vertically on the base unit. The support may, for example, be arranged at an outermost edge or corner of the base unit so as not to obstruct the path for driving onto the placement area as far as possible. The vertical arrangement also makes good use of the available installation space on the base unit in terms of area.

The base unit may be divided into two separate surface sections, wherein each surface section is individually attachable to the floor rails. By dividing the base unit into two separate surface sections, weight can be saved. Both surface sections comprise first fastening elements. It is conceivable that the number of first fastening elements of the two surface sections is equal to the number of first fastening sections of single-part base units described in the other embodiments.

The base unit may be tapered for a placement in a conical region of the respective aircraft. At least one lateral edge of the base unit thus comprises a tapered part or an edge section that is not parallel to the opposite edge.

The base unit may particularly be designed to be placeable on two parallel seat rails in an aircraft cabin. Thus, the width of the base unit exceeds the width of an arrangement of two seat rails. The first fastening elements are configured for fastening the base unit to the seat rails. Thus, the second fastening elements are provided in the form of the seat rails. The respective aircraft thus does not need to be modified in any aspect to allow installation of the holding system.

The base unit may also have an additional surface section spaced laterally from the placement area for additional installations. The additional surface may, for example, be used to accommodate an attendant seat, as mentioned previously. The user of the wheelchair may be brought into the aircraft by an attendant, and the attendant may sit on a seat on the additional surface section adjacent to the placement area. Other designs are also conceivable, in particular the arrangement of a storage compartment or the like.

An advantageous embodiment of the holding system further comprises a first vertical wall arranged on a rear side of the base unit behind the additional surface section. The first vertical wall may in particular be rigid or fixed and provided for performing a boundary of the additional surface section. The first vertical wall may be provided behind or in front of the additional surface section, wherein the arrangement behind the additional surface section offers advantages in particular in connection with the embodiment described below.

It is further advantageous if the retaining system further comprises a second vertical wall pivotally mounted to the support and pivotable to a closed position located directly behind the placement area and to an open position in a distance to the placement area. Consequently, the second vertical wall may utilize the support with a hinge disposed thereon to be pivotally suspended. The second vertical wall may be locked or latched to the first vertical wall in a closed position. A pivoted position allows the placement area to be opened from the outside to allow access for a wheelchair. Closing the second vertical wall, meanwhile, leads to the possibility of providing additional installations for the wheelchair.

The second wall may further comprise an arresting device configured to releasably engage a complementary shaped receptacle of the wheelchair. As stated previously, the second wall may include additional installations for the wheelchair. An arresting device may engage certain shape features of the wheelchair that the receptacle provides.

It is advantageous if the seat belt is arranged on the second wall. The positioning of the seat belt may thus be adapted very well to the width of the placement area. In addition, a comfortable height of the seat belt can be achieved.

The first vertical wall and the second vertical wall may form a closed surface in the closed state. In addition to being able to arrest the two walls together, a degree of privacy can also be established on the base unit.

In addition, the support may be designed as a third vertical wall. The third vertical wall may, for example, be arranged on a side surface perpendicular to the first wall and/or the second wall.

Finally, the invention relates to an aircraft comprising a cabin having a floor and at least one holding system according to one of the preceding claims, wherein the floor comprises second fastening elements to which the first fastening elements are fastenable.

The aircraft may be a commercial aircraft having one or more cabins in which a cabin floor with floor rails integrated therein is arranged as second attachment elements.

The holding system may be arranged directly in or adjacent to a door region.

Furthermore, the holding system may also be arranged in a conical region of the aircraft.

BRIEF DESCRIPTION OF THE DRAWINGS

Further features, advantages and possible applications of the present invention will be apparent from the following description of the embodiments and the figures. In this context, all the features described and/or illustrated constitute the subject-matter of the invention on their own and in any combination, also irrespective of their composition in the individual claims or their references. Furthermore, in the figures the same reference numerals stand for the same or similar objects.

DETAILED DESCRIPTION OF THE PREFERRED EMBODIMENTS

Figure 1:
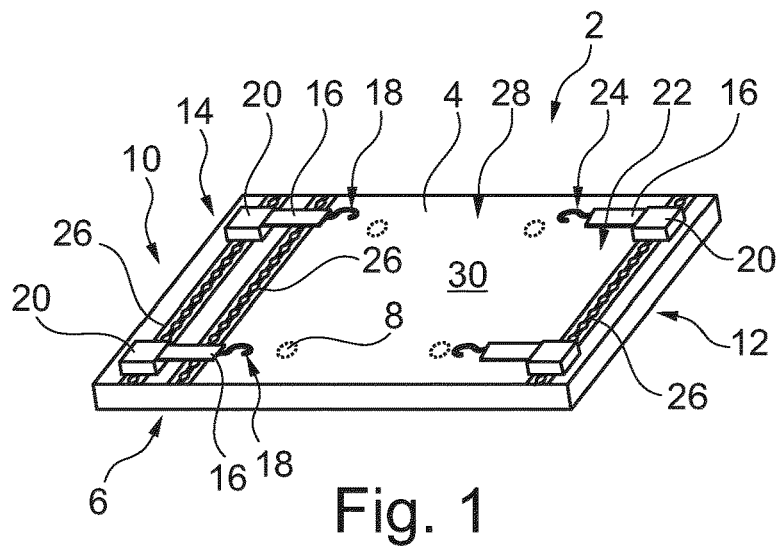
FIGS. 1 to 3 show various base units.

FIG. 1 shows a holding system 2 for a wheelchair in an aircraft. The holding system 2 comprises a base unit 4, which is designed as a plate-shaped component. In particular, it may be a rigid plate. It would also be conceivable to tolerate a defined deformation. First fastening elements 8 are arranged on an underside 6, which are only shown as dashed lines in FIG. 1 due to their position. The first fastening elements 8 serve to connect the base unit 4 to complementary shaped second fastening elements (not shown here). They may be provided in the form of studs or the like.

By way of example, the edge shown on the left in the drawing plane is a front side 10, while the edge shown on the right is a rear side 12. A front holding unit 14 is arranged on the front side 10. This has, by way of example, two lashing straps 16 as fixing elements, each of which has a front connecting element 18. The lashing straps 16 are each arranged on the base unit 4 via a holder 20, wherein the holder 20 may each have a winding mechanism which manipulates the length of the lashing straps 16 and may apply a tensile force. The lashing straps 16 may be connected to a wheelchair via the front connecting element 18, in order to brace the wheelchair forwards towards the front 10 by applying a tensile force.

Similarly, a rear holding unit 22 is located at the rear side 12, which is equipped with two lashing straps 16 as fixing elements, each with a rear connecting element 24. The lashing straps 16 are also connected there to the base unit 4 via holders 20. All holders 20 shown in FIG. 1 are arranged on an upper side 28 of the base unit 4 via base rails 26. The base rails 26 allow variable positioning in the horizontal direction. On the front side 10, for example, two base rails 26 are arranged at a distance from each other and parallel to each other, allowing easy adjustment along the longitudinal direction. A placement area 30 is defined between the front holding unit 14 and the rear holding unit 22. A wheelchair can be placed and braced on the placement area 30.

Figure 2:
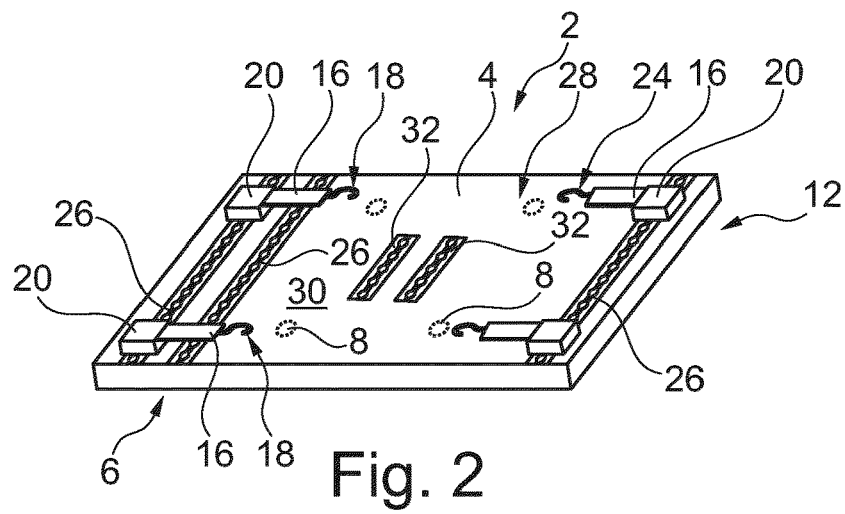

FIG. 2 shows the holding system 2 having an additional holding rail 32 on the placement area 30, on which an additional arresting device (see FIG. 7) may be arranged to enable additional holding or bracing of the wheelchair.

Figure 3:
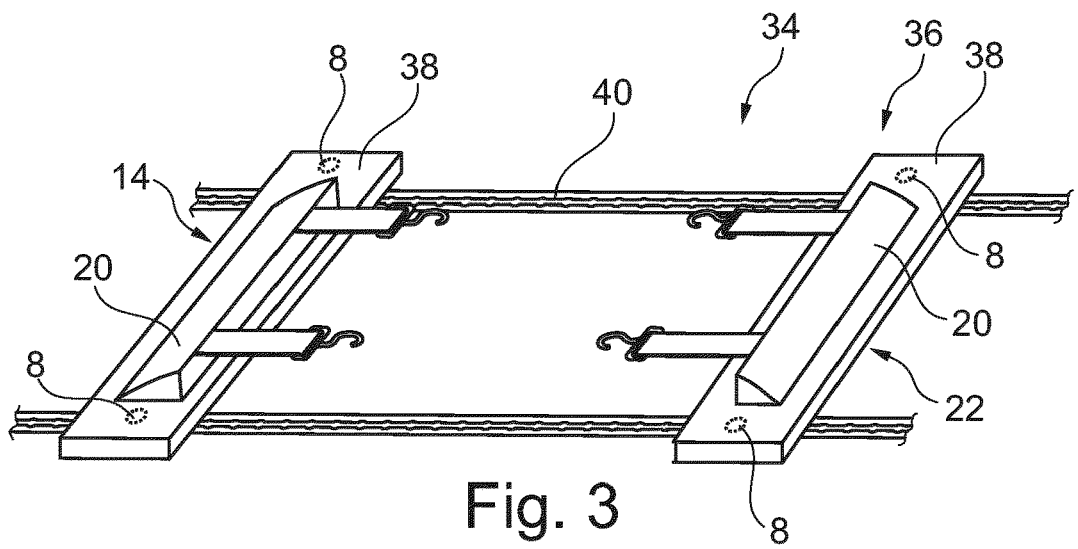

FIG. 3 shows a somewhat modified variant in the form of a holding system 34. Here, a base unit 36 is provided in the form of two plate-shaped surface sections 38, each of which are attachable to floor rails or seat rails 40 in an aircraft. For this purpose, both plate-shaped surface sections 38 comprise corresponding first fastening elements 8 which are provided for such floor rails 40. It should be noted at this point that the base units 4 of FIGS. 1 and 2 may also be designed for attachment to such floor rails 40.

The advantage of the two-part design of the base unit 36 is the particularly flexible positionability of the individual holding units 14 and 22, which can adjust a size of the placement area 30. As indicated in FIG. 3, the holding units may also have only individual, significantly wider holders 20, which extend over a significantly greater width than the holders 20 shown in FIGS. 1 and 2. However, the function remains the same.

Figure 4:
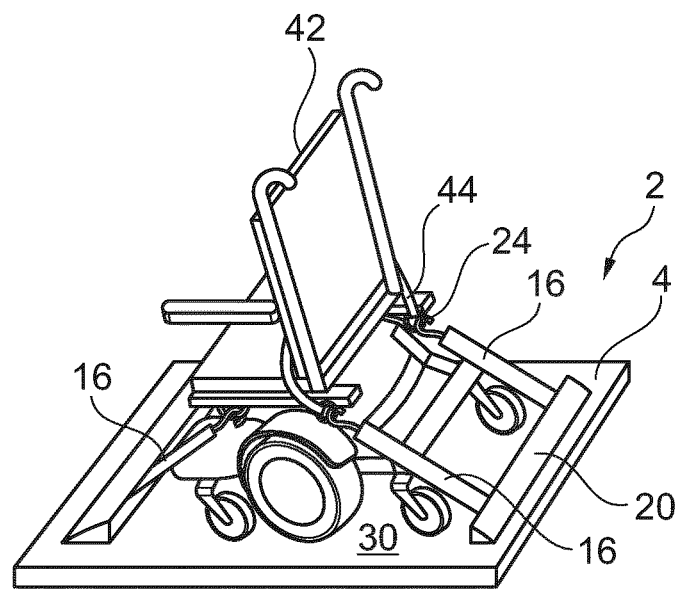
FIG. 4 shows a wheelchair secured by means of a holding system.

FIG. 4 shows the holding system 2 in which the holders 20 are designed as in FIG. 3. Here, a wheelchair 42 is arranged on the placement area 30. The lashing straps 16 are braced with the wheelchair 42 so that it stands securely on the base unit 4 even with the inertial forces that arise. In addition to this, an additional safety belt 44 is coupled to the base unit 4. In the embodiment shown, the safety belt 44 is placed by coupling with the connecting elements 24. The combination of base unit 4 and wheelchair 42 can be mounted on a floor in a cabin of an aircraft without the floor requiring special adaptations to the dimensions of the wheelchair 42.

Figure 5:
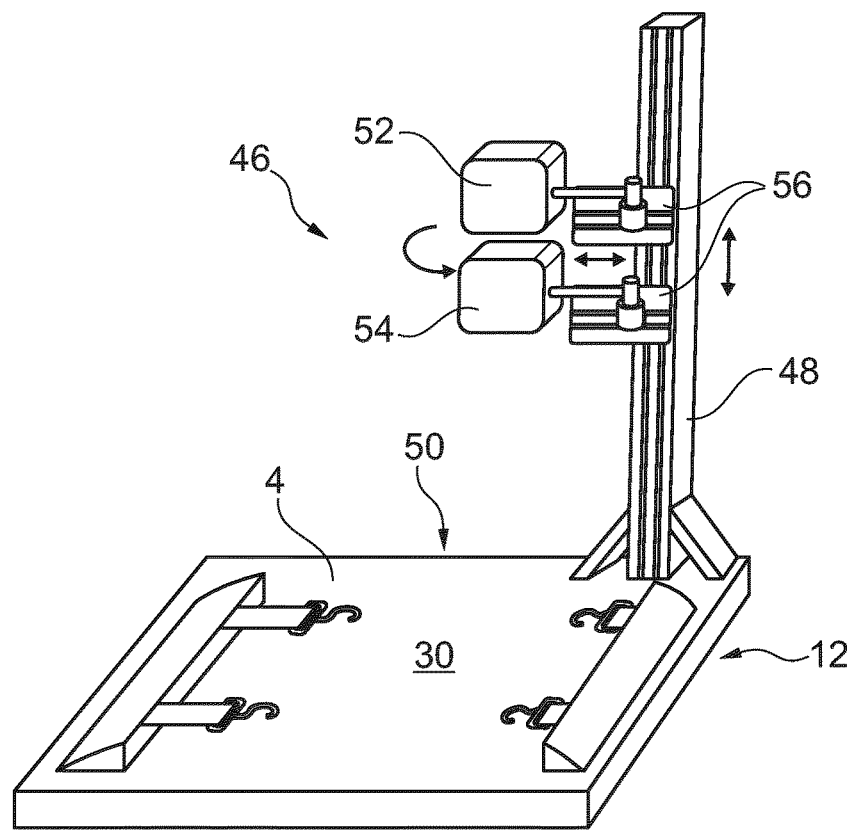
FIG. 5 shows a support with support elements on a base unit.

FIG. 5 illustrates a modified variant in the form of a holding system 46, in which the base unit 4 of FIG. 4 is provided with an additional support 48. It stands vertically on a lateral edge 50 of the base unit 4 in the area of the rear side 12, where two support elements 52 and 54 are attached. They are mounted on the support 48 via corresponding slides 56 so as to be pivotable, horizontally and vertically displaceable. The upper support element 52 may serve as a headrest for a user of the wheelchair 42, while the lower support element 54 may serve as a backrest.

Figure 6:
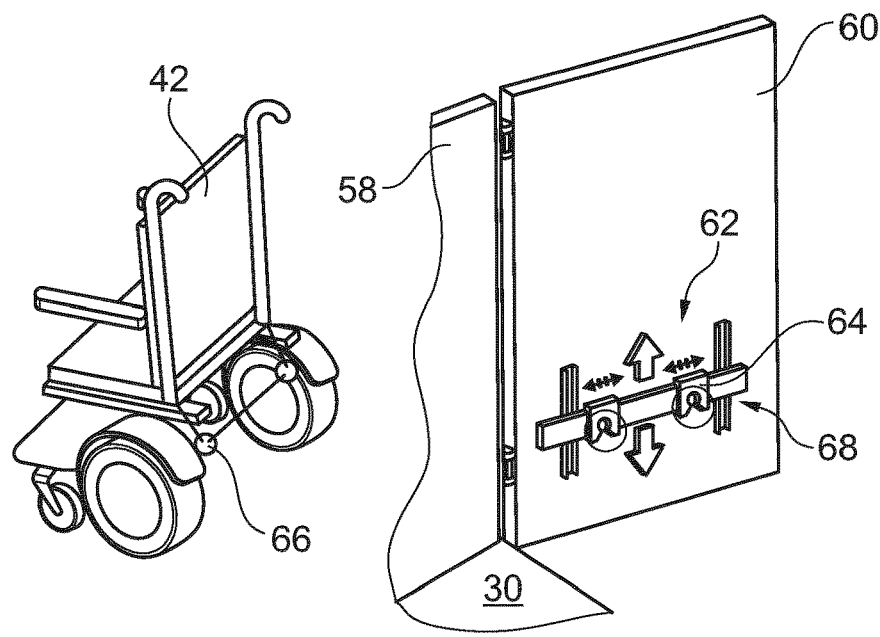
FIGS. 6 and 7 show further embodiments of a support and other features of the holding system.

FIG. 6 shows an alternatively designed support in the form of a vertical wall 58, which is further referred to below as a third wall 58, on which a pivotable second vertical wall 60 is arranged. This is located directly behind the placement area 30 and can be brought into a swung-open position (shown here) or a closed position for driving over the placement area 30. In addition to this, an arresting device 62 is arranged on the second vertical wall 60 as a further possible fixing element, which has engagement elements 64 that are insertable into corresponding receptacles 66 of the wheelchair 42. This may be used, for example, to provide additional support for the rear holding unit 22. The arresting device 62 permits adjustment to the height and lateral position of the receptacles 66. A wall-mounted X-Y rail system 68 is provided for this purpose.

Figure 7:
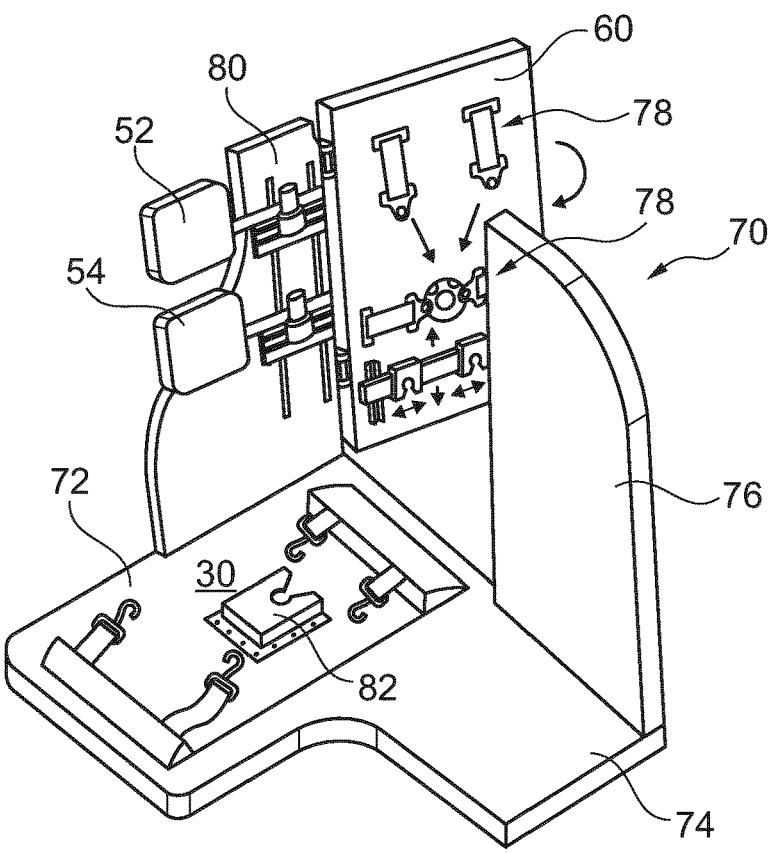

FIG. 7 shows a further modified variant of a holding system 70, in which the base unit 72 also comprises the placement area 30, which is supplemented laterally by an additional surface section 74. Behind the additional surface section 74, a first vertical wall 76 is arranged which is fixed. The second vertical wall 60 is likewise provided and carries, by way of example, a safety belt 78. The second vertical wall 60 is arranged on a third vertical wall 80, which may correspond to the wall 58 of FIG. 6. Here, however, the support elements 52 and 54 of FIG. 5 are supplemented accordingly. In addition, the placement area 30 may comprise an additional holding element 82 as a fixing element, which is attachable to the rails 32 from FIG. 2, for example.

Figure 8:
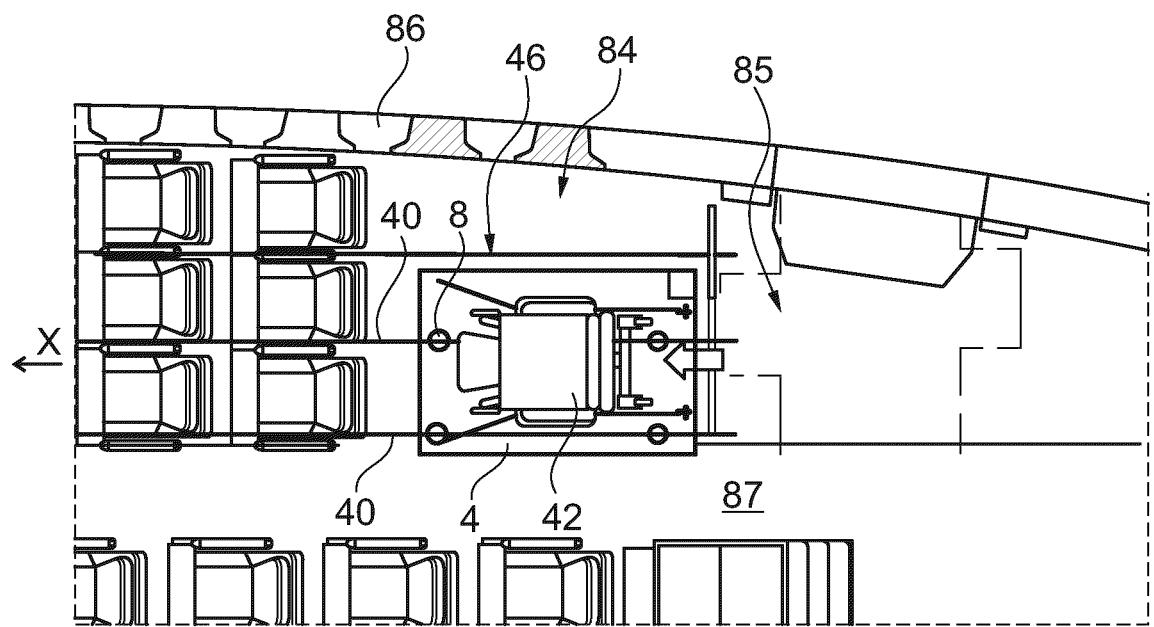
FIGS. 8 to 14 show various arrangements and holding systems in an aircraft cabin.

FIG. 8 shows a lateral half of a passenger cabin 84 of an aircraft 86 in a plan view. There, a conical region is shown in which a width of the cabin 84 descends in a direction opposite to the direction of flight. Three seat sections are provided, divided into two outboard lateral seat sections and a middle seat section. Here, as an example, the holding system 46 is provided directly in front of a door region 85 in the area of a lateral seat section. A wheelchair 42 is disposed on the base unit and is directly adjacent to an aisle 87. Consequently, the placement area 30 can be accessed directly from the door region 85, which is very convenient because the wheelchair 42 can be maneuvered there very easily. The base unit 4 ends at a clear distance in front of the associated lateral cabin wall. The base unit 4 is connected, by way of example, via four first fastening elements 8 which are connected, by way of example, to two directly adjacent floor rails 40. For this purpose, a pair of floor rails 40 adjacent to the aisle 87 of a total of three floor rails 40 extending parallel to and spaced apart from each other is used. The floor rails 40 extend parallel to the longitudinal direction x of the respective aircraft.

Figure 9:
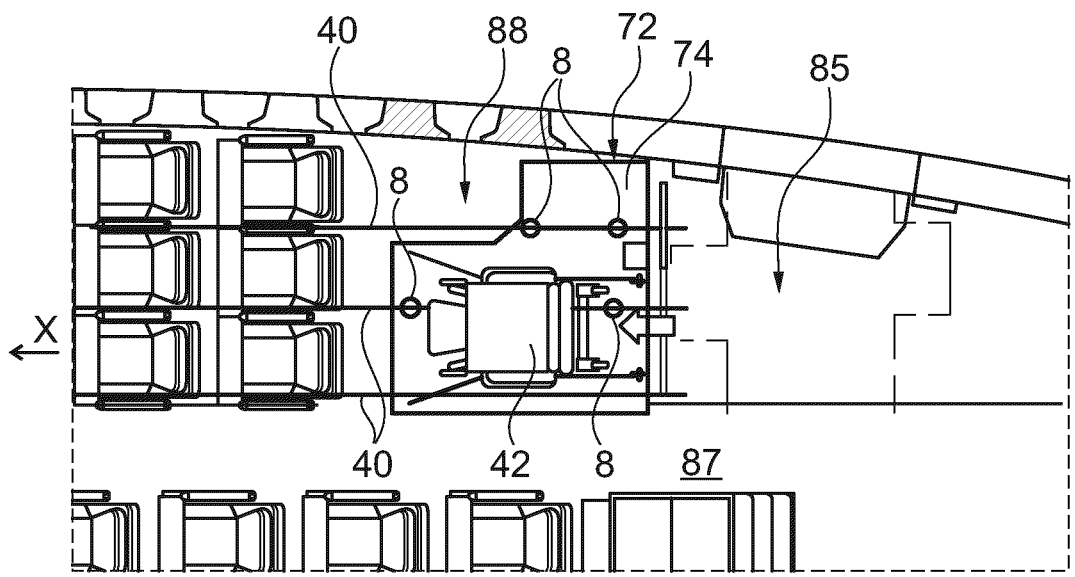

FIG. 9 shows a somewhat modified variant compared to FIG. 8, in which a holding system 88 with a base unit 72 that is mirror-inverted compared to the illustration in FIG. 7 and a wheelchair 42 is also provided directly in front of the door region 85. A surface section of the base unit 72, which contains the placement area 30, corresponds approximately to the size of the base unit 4 of FIG. 5 and is placed in the same manner. However, an additional surface section 74 is provided in this case and extends laterally outward toward the cabin wall. The additional surface section 74 can be used to accommodate a storage compartment, table or seat not shown here. Exemplarily, the base unit 72 is secured by four first fasteners 8 connected to a laterally outward pair of adjacent floor rails 40. These also extend parallel to the longitudinal direction of the respective aircraft.

Figure 10:
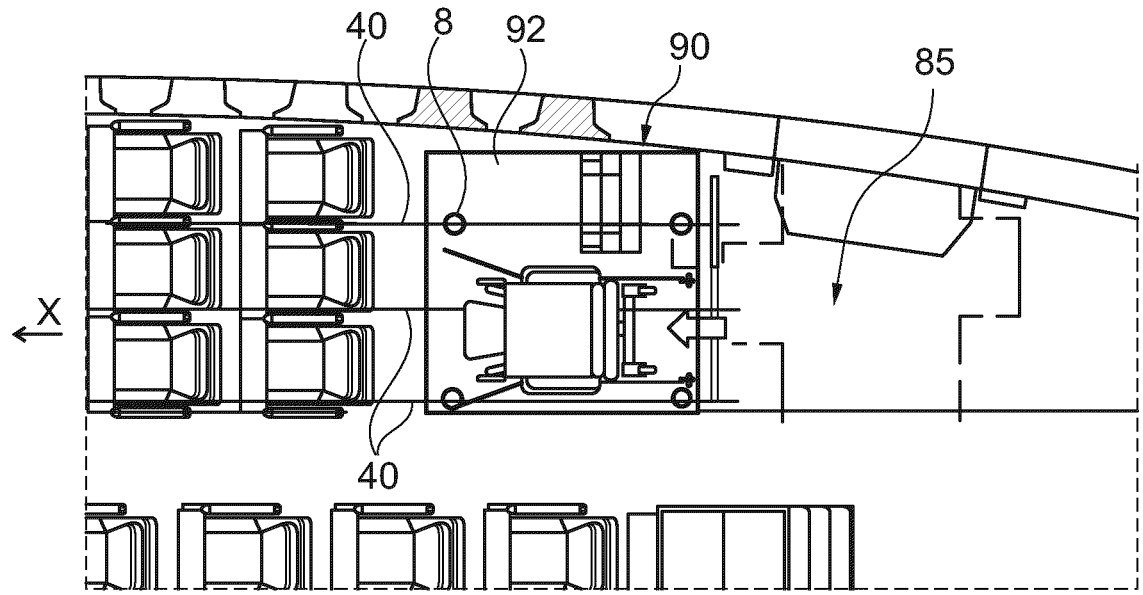

FIG. 10 shows a further modified embodiment of the embodiment examples of FIGS. 8 and 9 in the form of a holding system 90, which has a base unit 92 that is significantly enlarged compared to the previous illustrations. This is exemplarily connected via four first fastening elements 8 to two exemplarily not directly adjacent floor rails 40. The floor rails 40 extend parallel to the longitudinal axis of the respective aircraft. Again, the base unit 92 is directly adjacent to the door region 85. The enlarged base unit 92 may allow consideration to be given to accommodating an additional passenger seat for an attendant. This could be provided or removed as needed, for example.

Figure 11:
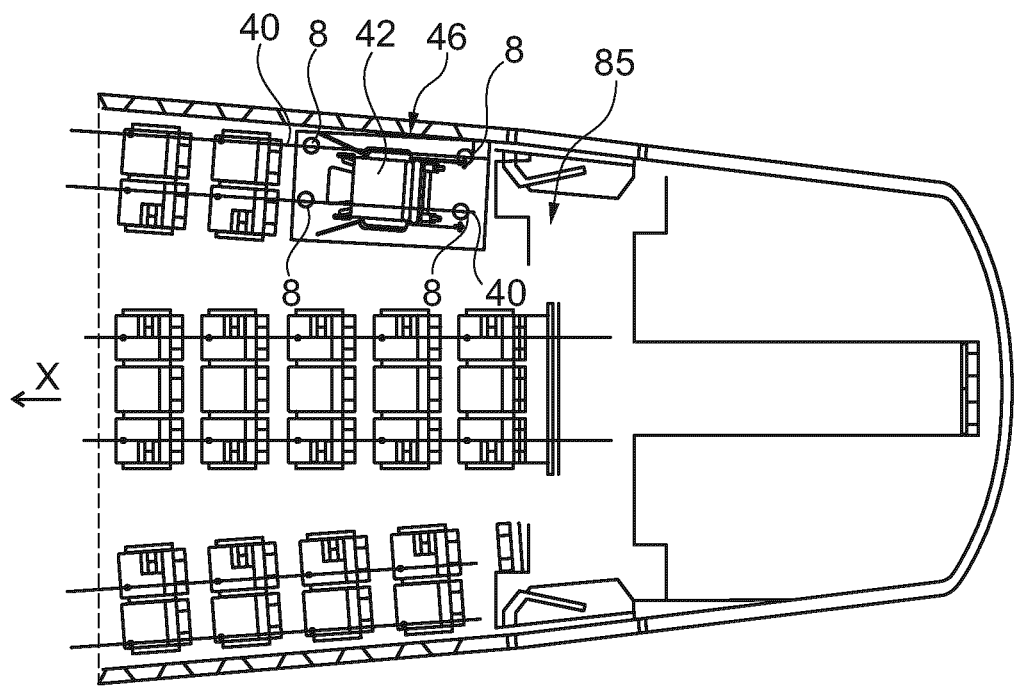

In FIG. 11, the holding system 46 is shown at the door region 85 in a slightly differently configured passenger cabin and is likewise adjacent to a lateral seat section. Here, only a pair of adjacent seat rails 40 is provided to which the base unit 4 is attached. In this case, the seat rails 40 and the longitudinal axis of the respective aircraft enclose an angle of more than 0°. Exemplarily, they extend substantially parallel to a cabin wall in the conical region.

Figure 12:
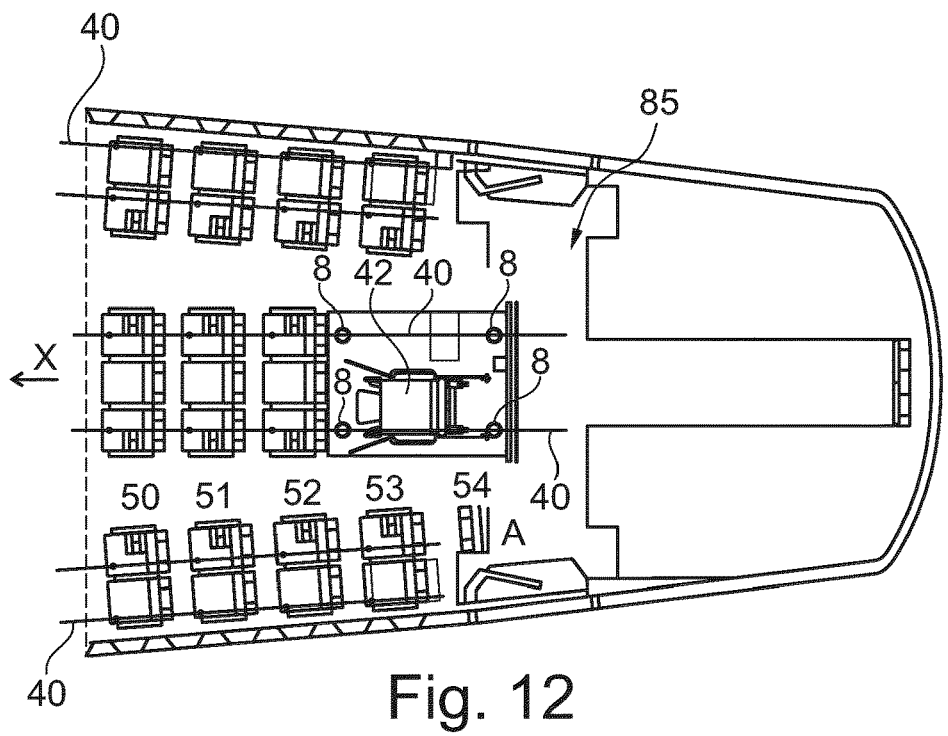

As shown in FIG. 12, the holding system 90 may also be disposed, by way of example, in a middle seat section immediately adjacent to or forward of a door region 85. Here, the rails 40 extend parallel to the longitudinal axis of the respective aircraft.

Figure 13:
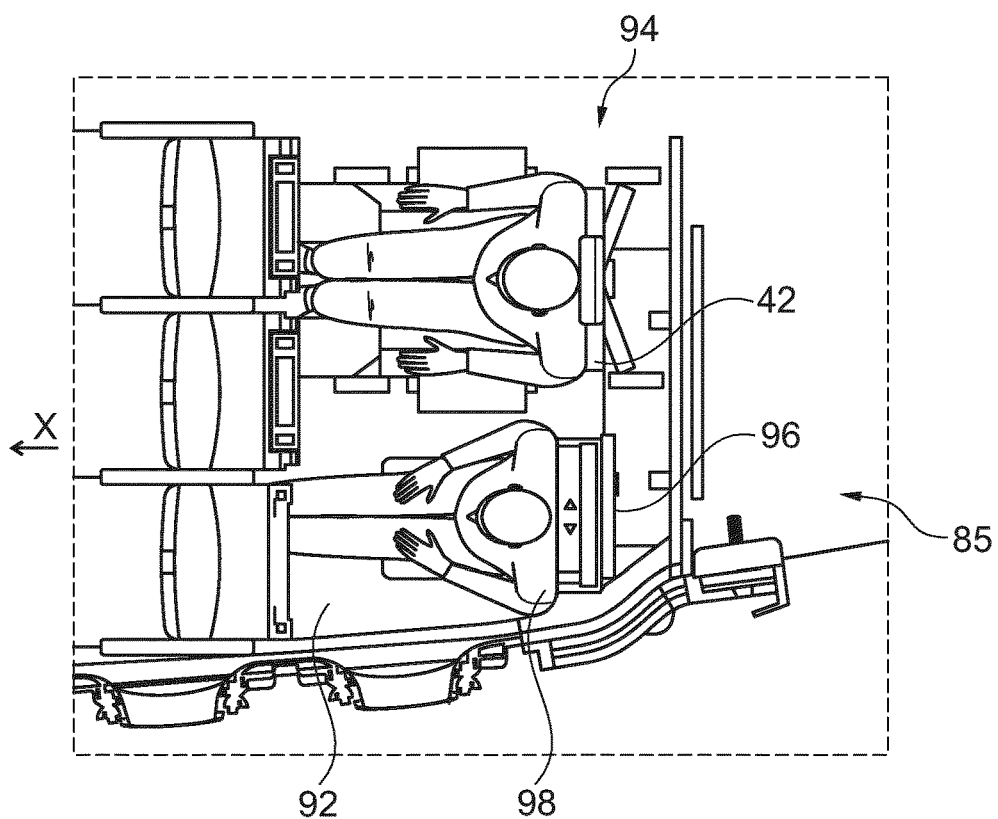
Figure 14:
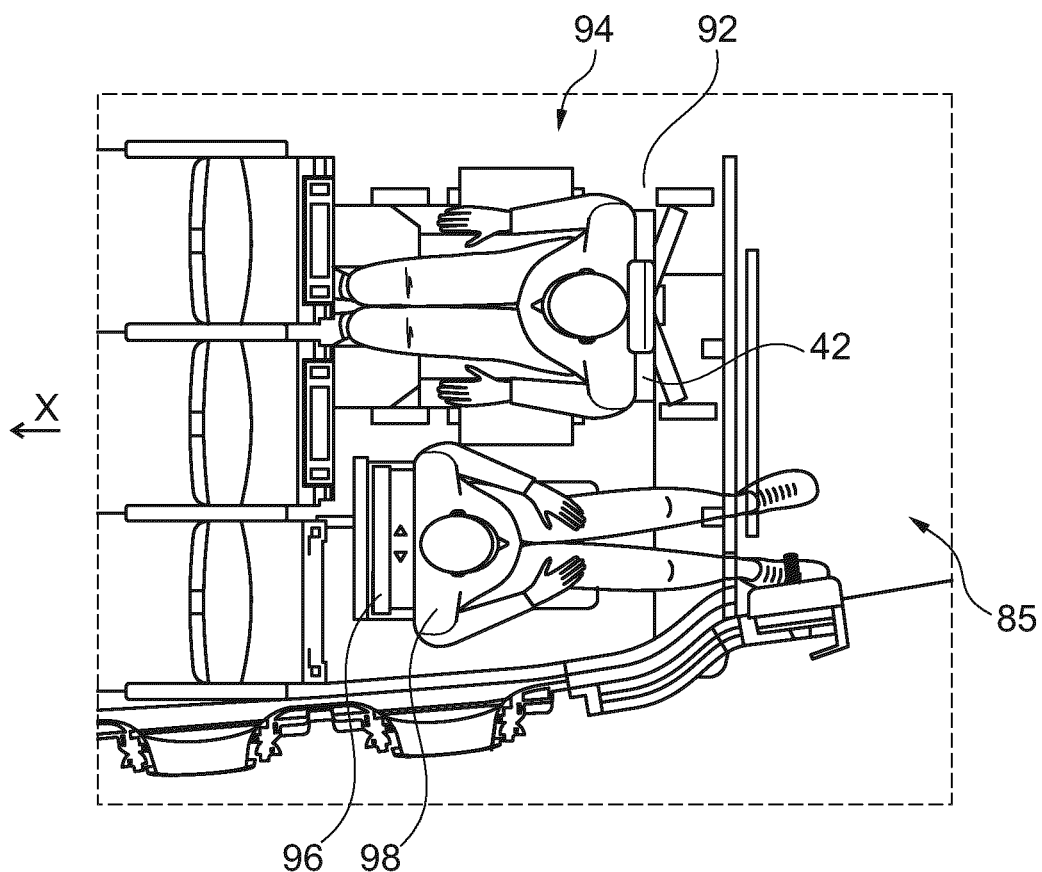

A top view in FIG. 13 shows a holding system 94 in which an additional attendant seat 96 is arranged on the base unit 92, which is located directly in front of the door region 85. The attendant seat 96 is facing in the direction of flight. In FIG. 13, however, the additional attendant seat 96 is facing opposite to the direction of flight so that an attendant 98 has slightly more legroom available. In addition, the attendant 98 can make eye contact with the person on the wheelchair 42.

Figure 15:
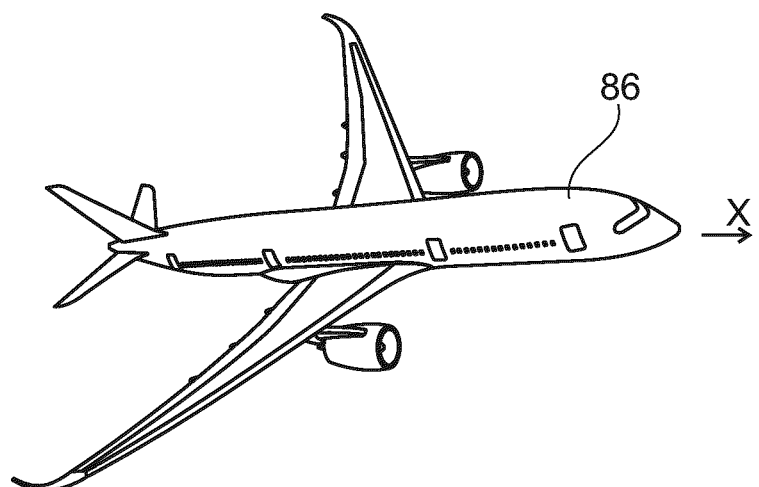
FIG. 15 shows an aircraft.

FIG. 15 shows the aircraft 86 in a 3-dimensional view.

Figure 16:
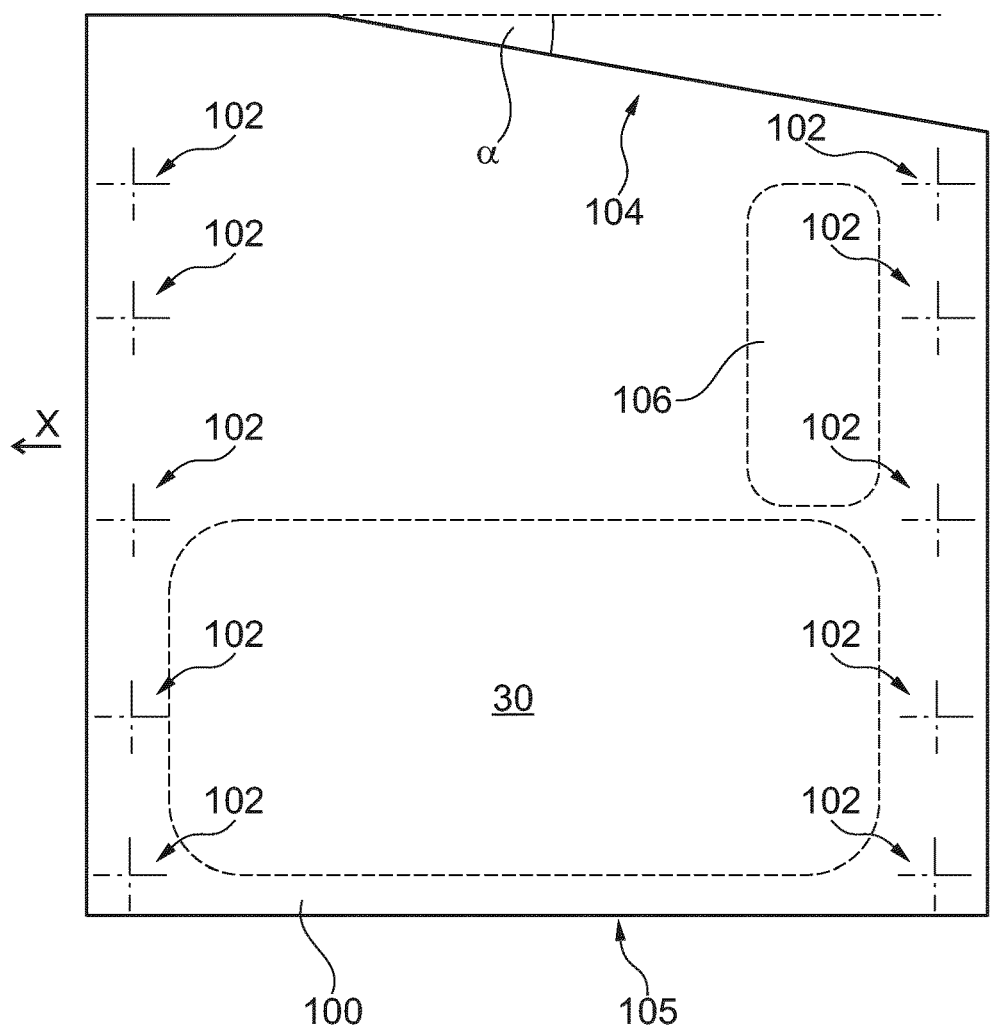
FIG. 16 shows a base unit with a tapered outer edge in a top view.

FIG. 16 shows a base unit 100, which is provided as a plate-shaped component. In the illustration the placement area 30 on the upper side is indicated with dashed lines. On the left side in the drawing plane, an arrow to the left is shown, which indicates the longitudinal direction of the respective aircraft (x-axis).

Exemplary, the base unit 100 is tapered on one lateral side 104, which is shown on the upper side of the drawing plane. A tapering angle α of approximately 10° is used. This allows to place the base unit 100 in a conical region of an aircraft cabin, where the seat rails 40 extend parallel to the longitudinal axis x of the aircraft.

The opposite edge 105, however, exemplarily extends parallel to the x axis. The tapered edge may thus be placed in the aircraft cabin on the right-hand side directly adjacent to a tapering cabin wall. By the tapering, a collision between the base unit 100 and the cabin wall is prevented. The opposite edge 105, however, extends parallel to an aisle that is parallel to the longitudinal axis x of the aircraft.

Furthermore, a pattern or arrangement of attachment points 102 is shown. These may be realized in the form of through-holes, which allow to attach first fastening elements 8 to the base unit 100. It is conceivable that the pattern is designed in such a way, that the base unit 100 may be inserted into several different aircraft, different cabin configurations, different installation positions within the cabin, etc. It may be possible to design the pattern in such a way, that the base unit 100 is arrangeable literally in every possible installation position of existing aircraft of a single or multiple manufacturers. Thus, the base unit 100 may be brought into the aircraft cabin when desired and the aircraft cabin does not need to be modified at all.

In the exemplary embodiment of FIG. 16, the base unit 100 is dimensioned in such a way, that an installation space 106 for an attendant seat is provided directly adjacent to the placement area 30.

Figure 17:
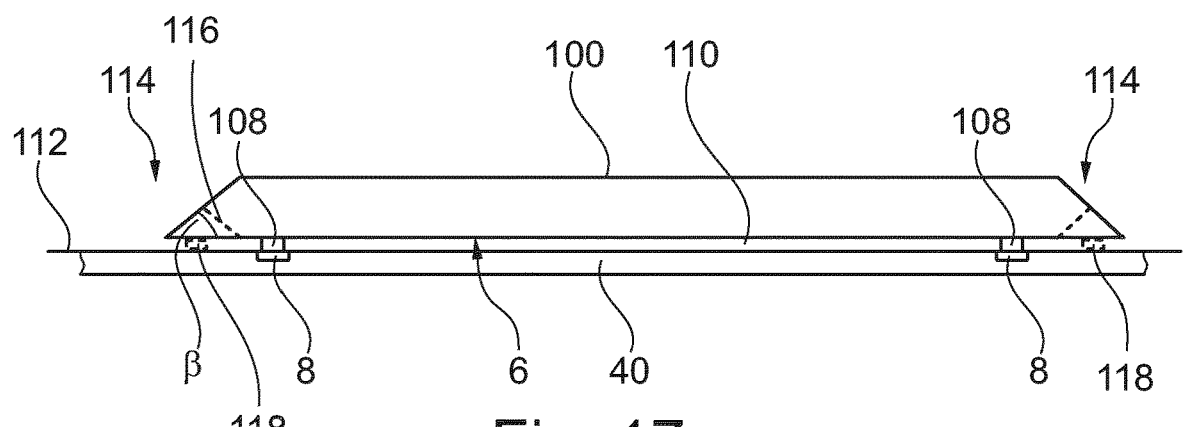
FIG. 17 shows a base unit with beveled edges.

In FIG. 17, the base unit 100 is shown in a side view. At the underside 6, four bearing elements 108 are provided, wherein two of which are visible in this illustration. Thus, a gap 110 between a cabin floor 112 and the underside 6 is created. The gap 110 is directly dimensioned by the extension of the bearing elements 108. At the bearing elements 108, the first fastening elements 8 are attached. These are connected to the floor rails 40 to fix the base unit 100. The bearing elements 108 may be designed to at least partially compensate a twist or torsion-bending of the aircraft structure.

It is conceivable to provide a gap height in a range of 3 mm to 10 mm. It should be noted that it may be beneficial to limit the height of the placement area to not exceed 25 mm in order to avoid a trip hazard.

Furthermore, outer edges 114 of the base unit 100 are beveled. Here, the outer edges 114 and the cabin floor 112 or the underside 6 enclose an angle β of about 30°. Resultantly, a wheelchair may be brought more easily onto the upper side of the base unit 100. As shown with dashed lines, the outer edges 114 may also comprise a chamfer 116 at the underside 6. Hence, if the cabin floor 112 twists, a contact between the base unit 100 can reliably be prevented. As an alternative, a plurality of elastically deformable pads 118 may be provided optionally. These may increase a contact surface between the base unit 100 and the cabin floor 112 in situations, where the aircraft structure is twisted or torsion-bent to such an extent, that the outer edges 114 of the base unit 100 are likely to contact the cabin floor 112.

In addition, it should be noted that "comprising" does not exclude other elements or steps, and "a" or "an" does not exclude a plurality.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the term "or" means either or both. Furthermore, characteristics, features or steps which have been described may also be used in combination with other characteristics, features or steps and in any order unless the disclosure or context suggests otherwise. This disclosure hereby incorporates by reference the complete disclosure of any patent or application from which it claims benefit or priority.

The invention claimed is:

1. A holding system for a wheelchair in an aircraft, comprising:
    a plate-shaped base unit having first fastening elements at an underside configured to be connected to complementarily shaped second fastening elements formed as floor rails or hard points on a floor or surrounding structure in the aircraft for fastening the base unit,
    a front holding unit and a rear holding unit spaced apart on an upper surface of the base unit and defining therebetween a placement area for the wheelchair, and
    a support arranged on the base unit and at least one support element mounted on the support via slides so as to be pivotable about an axis displaced from the support and horizontally displaceable and configured to provide support for a user of the wheelchair when the wheelchair is arranged on the placement area,
    wherein the front holding unit and the rear holding unit are configured to form a releasable, form-fit connection with the wheelchair arranged on the placement area, so that the wheelchair is braced between the front holding unit and the rear holding unit, and
    wherein the holding system is configured to fix the wheelchair stationarily on the floor during operation of the aircraft.

2. The holding system according to claim 1, wherein the base unit is beveled on at least one outer edge.

3. The holding system according to claim 1, further comprising a plurality of bearing elements on an underside of the base unit for maintaining a distance of the underside of the base unit and the floor.

4. The holding system according to claim 3, wherein the first fastening elements are at least one of attached to, integrated into, or coupled with the bearing elements.

5. The holding system according to claim 1,
    wherein the base unit comprises a pattern created by a plurality of attachment points, and
    wherein the pattern is configured for receiving a set of first fastening elements in different position constellations to adapt to different sets of second fastening elements in the respective aircraft.

6. The holding system according to claim 5, wherein the set of first fastening elements comprises four first fastening elements.

7. The holding system according to claim 1, wherein the front and rear holding units comprise fixing elements, each of which has a connecting element at a free end for form-fit connection to the wheelchair.

8. The holding system according to claim 1, further comprising a safety belt for a user of the wheelchair that is couplable to the base unit.

9. The holding system according to claim 1, wherein the support is positioned vertically on the base unit.

10. The holding system according to claim 1,
    wherein the base unit is divided into two separate surface sections, and
    wherein each surface section is individually attachable to the floor rails.

11. The holding system according to claim 10, wherein the base unit is tapered for a placement in a conical region of the respective aircraft.

12. The holding system according to claim 7, wherein the base unit comprises an additional surface section laterally spaced from the placement area for additional installations.

13. The holding system according to claim 12, further comprising a first vertical wall arranged on a rear side of the base unit behind the additional surface section.

14. The holding system according to claim 1, further comprising a second vertical wall pivotally mounted to the support and pivotable to a closed position located directly behind the placement area and to an open position in a distance to the placement area.

15. The holding system according to claim 14, wherein the second wall further comprises an arresting device configured to releasably engage a complementary shaped receptacle of the wheelchair.

16. An aircraft, comprising:
    a cabin having a floor, and
    at least one holding system according to claim 1,
    wherein the floor comprises second fastening elements to which the first fastening elements are fastenable.

17. The aircraft according to claim 16, wherein the holding system is arranged directly in or adjacent to a door region.

18. The aircraft according to claim 16, wherein the holding system is arranged in a conical region of the aircraft.

19. A holding system for a wheelchair in an aircraft, comprising:
    a plate-shaped base unit having first fastening elements at an underside configured to be connected to complementarily shaped second fastening elements formed as floor rails or hard points on a floor or surrounding structure in the aircraft for fastening the base unit, and
    a front holding unit and a rear holding unit spaced apart on an upper surface of the base unit and defining therebetween a placement area for the wheelchair,
    wherein the front holding unit and the rear holding unit are configured to form a releasable, form-fit connection with the wheelchair arranged on the placement area, so that the wheelchair is braced between the front holding unit and the rear holding unit, wherein the holding system is configured to fix the wheelchair stationarily on the floor during operation of the aircraft, wherein the base unit is divided into two separate surface sections, wherein each surface section is individually attachable to the floor rails, and wherein the base unit is tapered for a placement in a conical region of the respective aircraft.

20. A holding system for a wheelchair in an aircraft, comprising:

a plate-shaped base unit having first fastening elements at an underside configured to be connected to complementarily shaped second fastening elements formed as floor rails or hard points on a floor or surrounding structure in the aircraft for fastening the base unit, a front holding unit and a rear holding unit spaced apart on an upper surface of the base unit and defining therebetween a placement area for the wheelchair, a support arranged on the base unit and comprising at least one support element for a user of the wheelchair, and a second vertical wall pivotally mounted to the support and pivotable to a closed position located directly behind the placement area and to an open position in a distance to the placement area, wherein the front holding unit and the rear holding unit are configured to form a releasable, form-fit connection with the wheelchair arranged on the placement area, so that the wheelchair is braced between the front holding unit and the rear holding unit, and wherein the holding system is configured to fix the wheelchair stationarily on the floor during operation of the aircraft.

* * * * *